Figure 1:
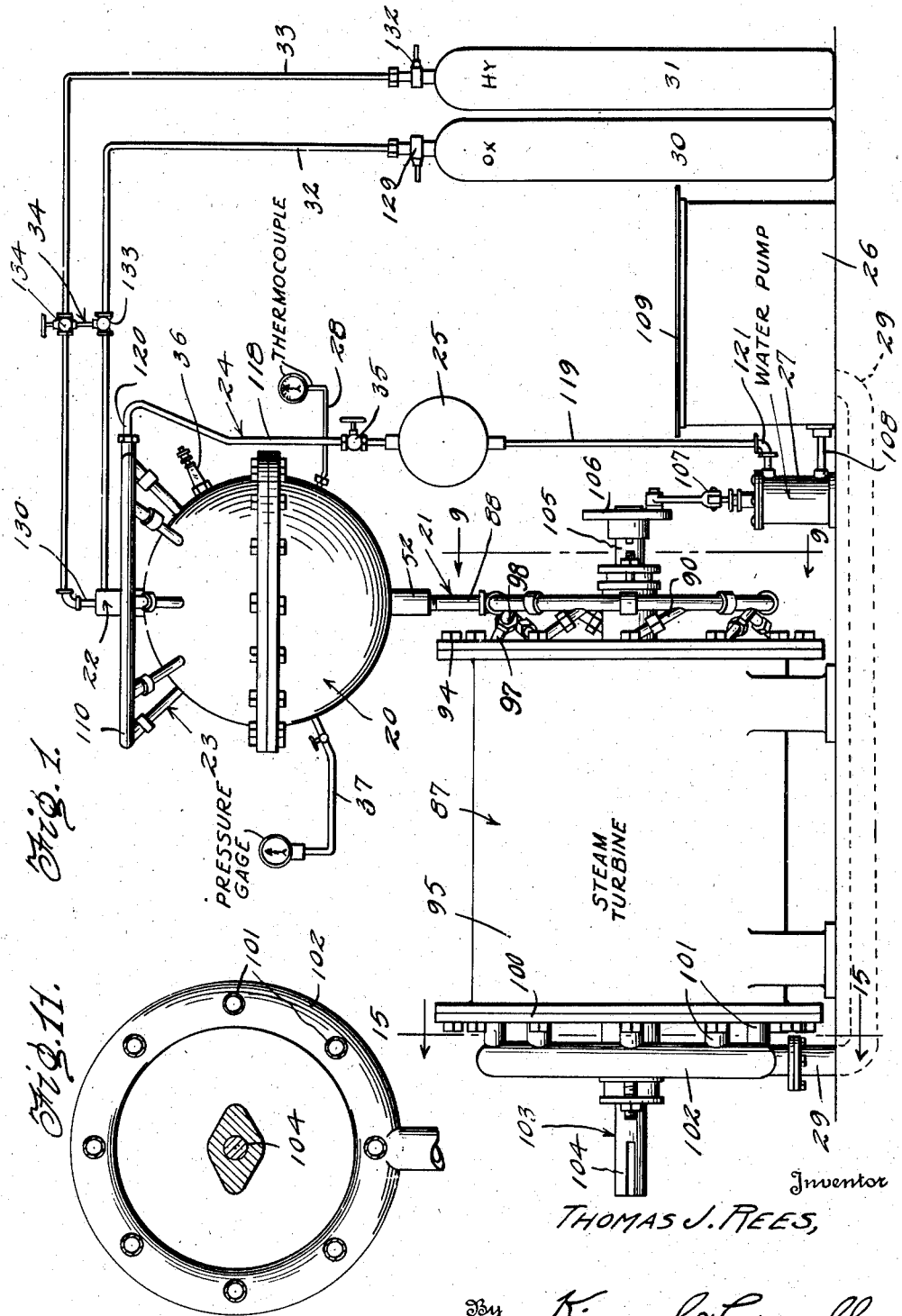

Oct. 27, 1942. T. J. REES 2,299,849

STEAM GENERATING PLANT

Filed July 19, 1940 4 Sheets-Sheet 2

Inventor
THOMAS J. REES

By Kimmel & Crowell
Attorneys

Oct. 27, 1942. T. J. REES 2,299,849
STEAM GENERATING PLANT
Filed July 19, 1940 4 Sheets-Sheet 3
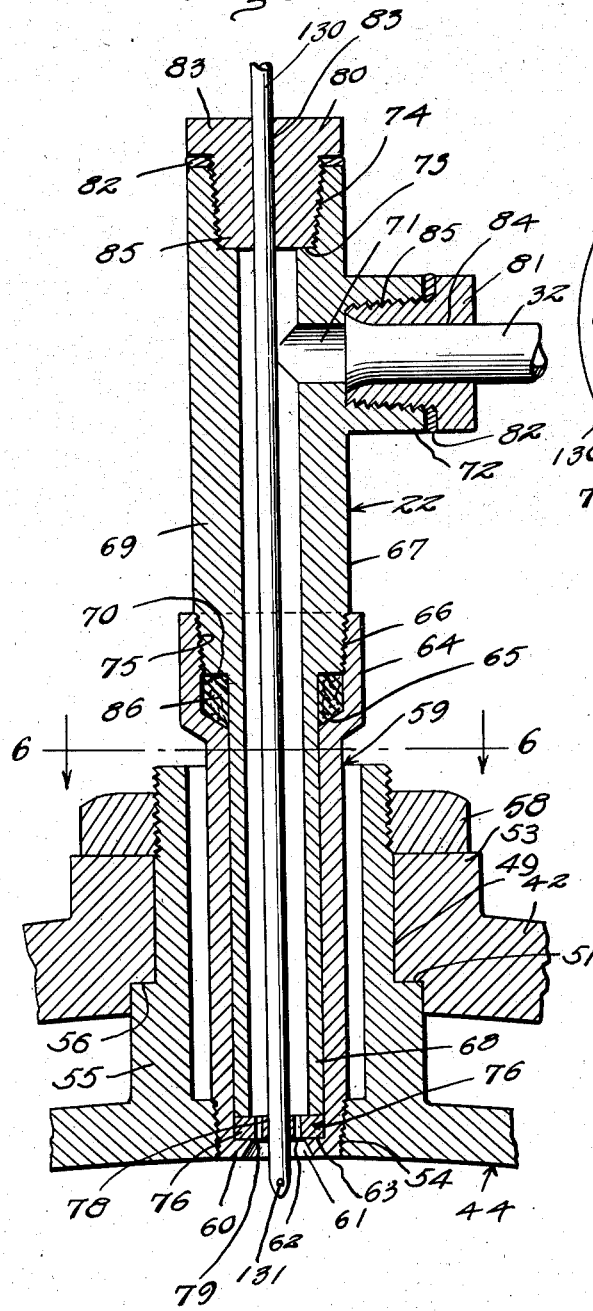
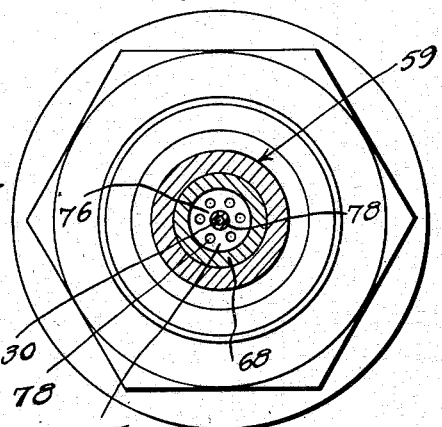
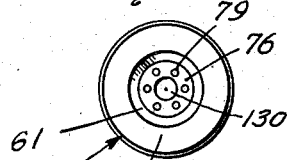
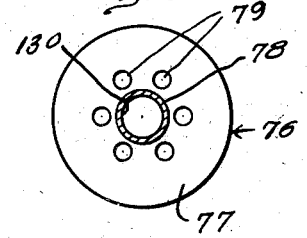
Inventor
THOMAS J. REES
By Kimmel & Crowell
Attorneys

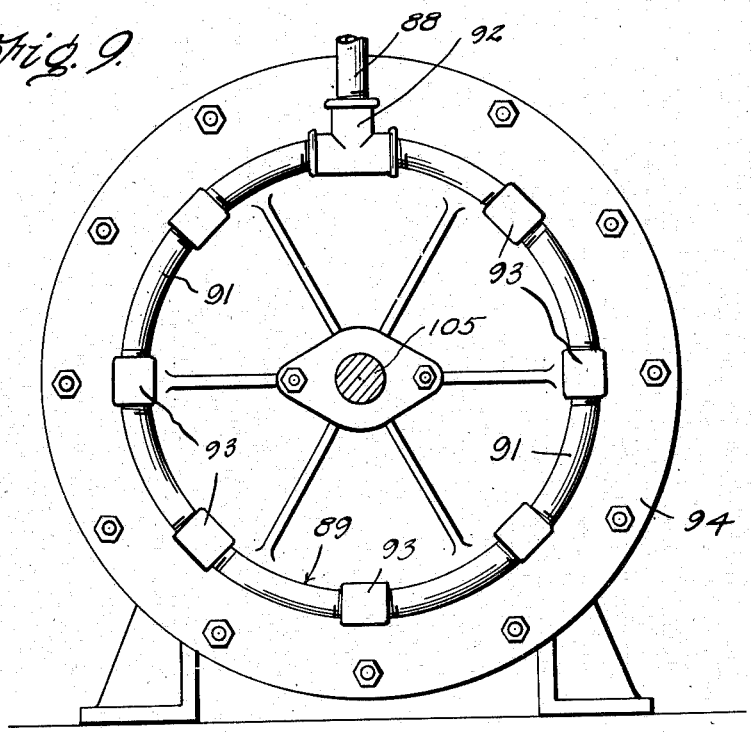
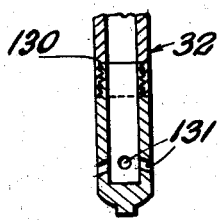
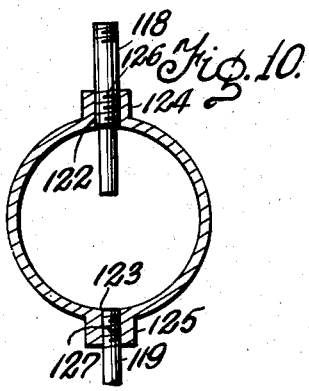

Patented Oct. 27, 1942

2,299,849

UNITED STATES PATENT OFFICE 2,299,849

STEAM GENERATING PLANT

Thomas J. Rees, Reno, Nev.

Application July 19, 1940, Serial No. 346,438

1 Claim. (Cl. 60—46)

This invention relates to a steam generating plant designed primarily for attachment to and for generating and supplying an energy medium to a steam turbine, but it is to be understood that a plant, in accordance with this invention is adapted for use in any connection for which it is found applicable, by way of example for attachment to and for supplying the energy medium to a reciprocatory engine.

The invention aims to provide, in a manner as hereinafter set forth, a steam generating plant especially adaptable for use in connection with aeroplane and submarine purposes where compactness in form is essential.

The invention further aims to provide, in a manner as hereinafter set forth, a steam generating plant whose cycle of operation is internal, whereby when installed in an aeroplane its power will increase in proportion as the atmospheric pressure diminishes and enable the aeroplane to operate in the stratosphere, where stormy and icy conditions never prevail.

The invention further aims to provide, in a manner as hereinafter set forth, an energy medium generating plant whereby when installed in a submarine it will reduce the weight of the latter, as it overcomes the necessity of employing the heavy storage batteries now used, and further the energy medium generated will not have any injurious effect on human life when the vessel is submerged.

The invention further aims to provide, in a manner as hereinafter set forth, a generating plant for the economical use of hydrogen and oxygen gases as fuel in the generation of steam to provide an energy medium for use in conjunction with a steam turbine or reciprocatory engine.

The invention further aims to provide, in a manner as hereinafter set forth, a steam generating plant including a pair of fuel lines, one for hydrogen and the other for oxygen for supplying said fuels to a combustion chamber to be combusted, a water conducting means for supplying water to an expansion chamber for steam generation and which receives the products of the combusted fuels from the combustion chamber to combine with the steam generated in the expansion chamber to form an energy medium, means for controlling the fuel lines to increase or decrease the pressure in the plant, and means for controlling the water conducting means to control the temperature of the energy medium.

The invention further aims to provide, in a manner as hereinafter set forth, a steam generating plant which is comparatively simple in its construction and arrangement, strong, durable, compact, readily assembled, thoroughly efficient in its use, conveniently controlled and comparatively inexpensive to build.

Embodying the aims aforesaid and others which may directly or indirectly hereinafter appear, the invention consists of the novel construction, combination and arrangement of parts as will be more specifically referred to and shown in the accompanyng drawings, wherein is shown an embodiment of the invention, but it is to be understood that changes, variations and modifications may be resorted to which fall within the scope of the invention as claimed.

Figure 2:
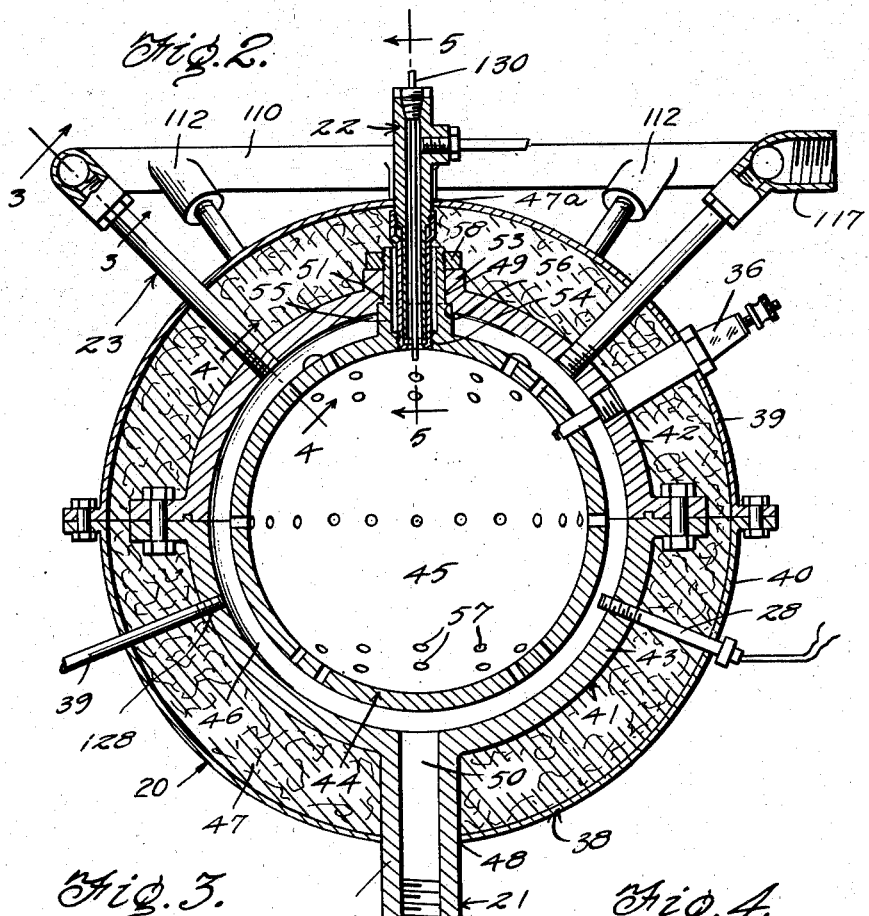
Figure 3:
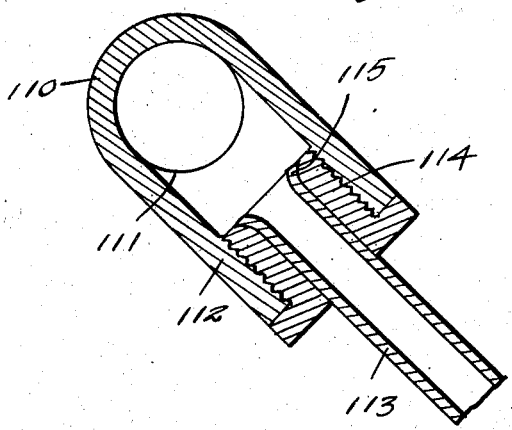
Figure 4:
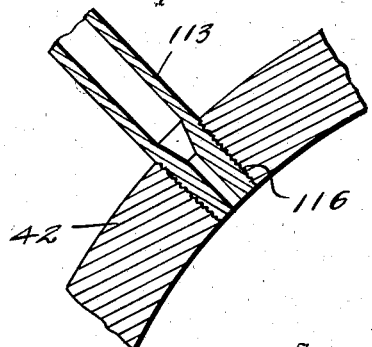

In the drawings:

Figure 1 is a front elevation of a steam generating plant, in accordance with this invention showing the adaptation thereof with a steam turbine, Figure 2 is a vertical sectional view of the plant, Figures 3, 4 and 5 are sections respectively on lines 3—3, 4—4 and 5—5 Figure 2, Figure 6 is a section on line 6—6 Figure 5, Figure 7 is a bottom plan of the burner tube with the outlet plate of the latter omitted, Figure 8 is a top plan of the outlet plate of the burner tube, Figure 9 is a section on line 9—9 Figure 1, Figure 10 is a sectional detail illustrating the water pressure tank interposed in the water conducting means, Figure 11 is a section on line 15—15 Figure 1, Figure 12 is a sectional detail of the lower portion of the hydrogen supply line.

The plant includes a generator structure 20 of spherical contour, an extension 21 for said structure forming a combined outlet and energy medium directing means, a combined burner and coupling structure 22, a water injector structure 23, a water conducting or supply line 24 having interposed therein a pressure tank 25 for the water, a water tank 26, a water pump 27, a thermo-couple 28 to register the operating temperature, a return line 29 leading to the water tank 26, a fuel tank 30 for oxygen, a fuel tank 31 for hydrogen, an oxygen supply line 32 leading from tank 30, a hydrogen supply line 33 leading from tank 31, a controlling throttle 34 common to and interposed in the lines 32, 33, a controlling throttle 35 for the line 24, one or more spark plugs 36, and a steam pressure gage 37.

The structure 20 includes a hollow spherical outer metallic housing 38 formed of a pair of oppositely disposed flanged superimposed semi-spherical sections 39, 40 detachably connected together, a spherical expansion chamber forming element 41 of metallic material consisting of a pair of oppositely disposed flanged superimposed semi-spherical sections 42, 43 detachably connected together, and a hollow spherical casting 44 forming a combustion chamber 45. The chamber provided by the element 41 is indicated at 46. The casting 44 is suspended in element 41 in spaced relation to the inner face of the latter. The element 41 is suspended in housing 38 in spaced relation to the inner face of the latter. A packing 47 of heat insulating material is interposed between housing 38 and element 41. The width of the space between the housing 38 and element 41 is greater than the width of the space between element 41 and casting 44. The housing 38, element 41 and casting 44 are disposed in co-axial relation.

The housing 38 is formed with a pair of diametrically disposed openings 47a, 48 at the centers of the sections 39, 40 respectively.

The element 41 is provided with a pair of diametrically disposed openings 49,50 at the centers of the sections 42, 43. The wall of the opening 49 is formed with an annular shoulder 51. The element 41 has formed integral with the bottom thereof the upper tubular portion 52 of the extension 21. The wall of portion 52 aligns with the wall of the opening 49 and extends through the packing 47, through the opening 48 and depends from the section 40 of housing 38. The top of element 41 is provided with an annular boss 53 having its inner face forming an upward continuation of the wall of opening 49. The casting 44 centrally of its top is formed with a threaded opening 54, an upstanding tubular extension 55 integral at its lower end with the periphery of the casting and surrounding in spaced relation the opening 54. The extension 55 constitutes a suspension for the casting and it is formed intermediate its ends with an annular peripheral shoulder 56. The casting 44 is provided with circumferentially extending superposed spaced rows of spaced openings 57 constituting outlets for the products of combustion from the combustion chamber 45. The openings 57 communicate with the expansion chamber 46. The rows of openings 57 consist of an upper pair of rows, a lower pair of rows and a central row. The latter is disposed at the horizontal center of the casting 44. The rows of the upper pair are horizontally disposed and arranged in proximity to the top of the casting 44. The rows of the lower pair are horizontally disposed and arranged in proximity to the bottom of the casting 44. The casting 44 has the portions thereof between the central row and the lower upper row and the upper lower row imperforate. The bottom of the casting 44 is imperforate. The extension 55 extends upwardly through opening 49 and boss 53 to above the latter, the shoulders 51, 56 abut, a nut 58 threadedly engages with the upper end of said extension 55 and binds against the top surface of boss 53 whereby the element 41 and casting 44 are clamped together, and with the casting suspended in the chamber 46 in spaced relation to the wall of the latter.

The combined burner and coupling structure 22 is anchored at its inner end to the wall of the opening 54 and extends from casting 44, up through respectively the extension 55, packing 47, opening 47 and to a point above the latter. The structure 22 includes an outer tubular member 59 formed at its inner end with an inwardly disposed annular flange 60 having a beveled inner side surface 61 to provide a tapered opening 62. The flange 60 also provides an annular seat or shoulder 63. The outer periphery of member 59 at the lower terminal portion thereof its tapered and threaded. The wall of opening 54 is also flared and it coacts with the flared portion aforesaid of the member 59 for connecting the latter and the casting together. The member 59 has an upper offset portion 64, an internal annular beveled seat 65 and internal threads 66 on portion 64. The structure 22 includes an inner tubular member 67 of greater length than the member 59. The member 67 has its inner portion 68 of reduced outer diameter with respect to the outer portion 69 thereof. The junction of said portions 68, 69 provides the member 67 intermediate its ends with an annular shoulder 70 on its outer periphery. The portion 69 is formed, intermediate its ends with a lateral opening 71 extending from its inner to its outer periphery, and a lateral internally threaded coupling collar 72 integral at its inner end with the outer periphery thereof. The inner end of collar 72 surrounds the outer end of opening 71 in spaced relation. The inner face of collar 72 flares from its inner to its outer end. The portion 69 adjacent its outer end is formed with an internal annular shoulder 73. The portion 69 has the inner end of its outer periphery threaded, as at 75.

The structure 22 includes an outlet plate 76 for one of the fuels. The plate 76 is in the form of a circular disc 77 formed with an axial opening 78 surrounded in spaced relation by a circular row of spaced openings 79. The structure 22 also includes a pair of tapered threaded coupling plugs 80, 81 for a purpose to be referred to and which also provide closures respectively for the outer ends of member 67 and the collar. 72. When the coupling plugs are in active position packing means 82 are interposed between the heads of the plugs and the member 67 and collar 72. The plugs 80, 81 are formed with axial bores 83, 84 respectively which are flared at their inner end portions, as at 85.

When the structure 22 is set up the member 59 is connected to the casting 44 and extends outwardly beyond the element 41. The plate 76 is then positioned on the shoulder 63. An annular packing 86 is then positioned on the seat or shoulder 65. The member 67 is then extended into the member 59 to an extent whereby the inner end of portion 68 will bind against the marginal portion of the upper face of plate 76. The binding action on plate 76 will be had by screwing member 67 into member 59, by the coaction of the threads 66, 75. As the member 67 moves inwardly relative to the member 59 the packing 86 will be compressed whereby the members 59, 67, packing 86 and plate 76 will be in the position as shown in Figure 5. The flange 60 and plate 76 constitute portions of the tip of the burner.

The extension 21 for the generator structure 20 is illustrated by way of example for use in connection with a steam turbine 87 which preferably will be of the vane type. As before stated the extension 21 forms a combined outlet and energy medium directing means, and its purpose is to supply such medium to the intake end or head of turbine 87. The extension not only includes the tubular portion 52 aforesaid which depends from element 41 and housing 38, but also a tubular branch 88 and an energy medium conductor in the form of a hollow annulus 89 provided on one side with a series of inclined spaced directing nozzles 90 flanged at their outer ends. The annulus includes tubular sections 91 of like form and of segmental contour. Two of the said sections are connected together by the head of an inverted T-coupler 92. The stem of the coupler 92 is attached to the branch 88, and the latter is connected to the lower end of the portion 52. Each of the sections 91 has formed integral with one side lengthwise thereof an outwardly extending inclined directing nozzle 90. The nozzles 90 are inclined in a like manner.

Two of the sections 91 are connected together by the coupler 92 and the others of the said sections are connected together by coupling sleeves or collars 93. The coupler 92 and sleeves 93, in connection with the section 91 provide the annulus 89. The latter is arranged in juxtaposition to the intake end of head 94 of the stator 95 of the turbine 87. The head 94 may be formed with spaced inclined intakes, not shown for the energy medium. Opening into and leading from each intake, as well as being integral with the head 94 is an inclined injector 97, which is coupled at its outer end, by the means 98 to the outer end of a nozzle 99. The exhaust end or head of the turbine 87 is designated 100 and is provided with outlets 101 which open into a hollow annular exhaust manifold 102 from which leads the return pipe 29 to the tank 26.

The shaft of turbine 87 is indicated at 103 and it extends, as at 104, 105 from the turbine heads 100, 94 respectively. The extended portion 104 of shaft 103 is employed for transmitting power. The extended portion 105 carries a drive 106 for the pump 27. The connection between drive 106 and pump 27 is indicated at 107. The pump 27 communicates with the tank 26 by the intake pipe 108 which opens into the tank 26. The latter has a removable lid 109 for access thereto.

The water ejector structure 23 includes a horizontally disposed hollow annulus 110 arranged above and in concentric relation to the section 39 of housing 38. The annulus 110 in its inner side is formed with spaced openings 111. Integral with the inner side of the annulus 110 are inwardly extending downwardly inclined internally threaded short sleeves 112 which communicate at their inner ends with the openings 111. Connected to each sleeve 112 is a water nozzle 113 of the vaporizing type which extends in the same plane as the plane of the sleeve to which it is attached. The nozzles 113 have mounted on their upper end terminal portions couplers 114 in the form of flanged peripherally threaded plugs which engage with the threads of the sleeve. The nozzles at their upper ends are flared, as at 115. The nozzles 113 extend respectively through the section 39 of housing 38 and the packing 47 and threadedly engage at their inner ends with the threaded walls of the openings 116 formed in the section 42 of the element 41. The nozzles 113 open into the chamber 46 and direct the water vapor against the casting 44 to convert the water into steam. The products of combustion from chamber 45 admix with the steam to superheat it and to form the energy medium. The annulus 110 is provided on its outer side with a laterally disposed internally threaded water intake 117. The nozzles 113 form a supporting means for the annulus 110.

The water conducting or supply line 24 is formed of an upper and a lower section 118, 119 respectively disposed in endwise spaced relation. The section 118 has an angularly disposed upper terminal portion 120 which opens into and is connected to the intake 117. The section 119 has an angularly disposed lower terminal portion 121 which is connected to and opens into the pump 27. The throttle 35 for the water line 24 is interposed in the section 118. The water pressure tank 25 acts as a coupling means between the sections 118, 119 of line 24, it is of hollow spherical contour and formed with a pair of diametrically disposed openings 122, 123 (Figure 14). The opening 122 is arranged centrally of the top and the opening 123 centrally of the bottom of tank 25. The walls of the openings 122, 123 are threaded. The tank 25 at its top and bottom is formed with internally threaded annulus bosses 124, 125 respectively having their inner faces forming upward and downward continuations of the walls of openings 122, 123 respectively. The section 118 of line 24 extends into the tank 25 from the top of the latter and above its lower end is formed with threads 126 for engagement with the threads of opening 122 and boss 124. The upper end of section 119 of line 24 has peripheral threads 127 which engage with the threads of opening 123 and boss 125. The throttle 35 is arranged in section 118 in proximity to the top of tank 25.

The thermo-couple 28 extends through the housing section 40, the packing 47 and the section 43 of element 41 into the chamber 46. The steam pressure gage 39 extends through the housing section 40, the packing 47 and has its inner end anchored in a threaded opening 128 formed on the section 43 of element 41.

The oxygen supply line 32 extends from the tank 30 and communicates with the opening 71 formed in the outer portion 69 of the outer tubular member 67 of the structure 22. The line 32 is coupled to the structure 22 by the plug 81, and in proximity to the upper end of tank 30 it is formed with a cutoff 129. The hydrogen supply line 33 extends from the tank 31 and includes a vertical part 130 which passes down through the tubular member 67, the opening 78 in disc 77, and into the upper portion of the combustion chamber 45. The lower end of the part 130 is closed, and such part in proximity to its closed lower end is provided with radially disposed outlets 131 arranged below the disc 77 and opening into the chamber 45. That portion of the part 130 of a line 33 arranged below the disc 77 forms the remaining portion of the burner tip. The part 130 passes through the closure plug 80 for the upper end of the member 67. The line 33 is formed with a cut-off 132 in proximity to the upper end of tank 31. The throttle 34 which is common to the lines 32, 33 consists of a pair of simultaneously operable connected together vertically aligned valve structures 133, 134 interposed in the lines 32, 33 respectively above the cutoff 129, 132. The spark plug 36 extends through the housing section 39, packing 47, the section 42 of element 41, chamber 46 and body of casting 44 into chamber 45.

In the generator structure, the pressure is directly obtained through expansion of the fuel gases, and to obtain the efficiency that is possible with this type of steam generator, the relativity of the burner area should coincide to the area of the directing nozzles 90 which should be of a dimension that would relieve the pressure within the generator, just prior to this pressure becoming equal to the injected fuel pressure.

A simple rule that will obtain 6 to 8 pounds difference in pressure, when using the gases hydrogen and oxygen as fuel, is to have the total area of the burner orifices, equal or slightly larger than the area of the directing nozzles. This pressure difference does not vary whether operating at 20 pounds or 100 pounds pressure, the pressure within the generator can be increased or decreased almost instantly by opening or closing the throttle on the fuel lines.

The temperature of the energy medium is determined by the quantity of water introduced into the expansion chamber, the water is injected under pump pressure through vaporizers at about 25 pounds higher pressure than the pressure within the generator. The water vapor coming in contact with the hot surface of the combustion chamber, is instantly transformed into steam, this steam is then sprayed with the products of combustion practically absorbing the total heat released through combustion of the fuel. The temperature of the medium is as readily governed by the throttle on the water line, as the pressure is governed by the fuel injected. The response on both pressure and temperature when operating the valves is almost instantaneous.

The pressure within this plant is produced through combustion of the fuel gases.

The temperature of the energy medium is determined by the quantity of water injected into the chamber, this manner of steam generation eliminates the use of a boiler in the production of steam. Decreases the weight of the turbine or engine per H. P. and without undue weight of metal enables the turbine or engine to operate at high pressure in the elevated temperatures.

Thereby, through conservation of heat in the greater elasticity of the energy medium, produces a steam engine of great thermo-efficiency.

Preferably the combined burner and coupling structure 22, the part 130 of line 32, the element 41 and the casting 44 will be formed of a nickel chrome alloy or of any suitable alloy possessing unusual durability against heat.

What I claim is:

In a steam generator an outer hollow casting forming an expansion chamber of spherical form, an inner hollow casting forming a combustion chamber of spherical form suspended in and spaced equidistant throughout from the wall of the expansion chamber, means for suspending the inner casting from the outer casting, the wall of said combustion chamber being formed with circumferential extending superposed spaced rows of spaced outlet openings opening into the expansion chamber, one of said rows being arranged in proximity to the top and another in proximity to the bottom of the wall of the combustion chamber, that part of the wall of the combustion chamber above said upper row of openings being formed centrally with a threaded opening, that part of the wall of said combustion chamber below the lower row of openings being imperforate, a hollow circular element disposed above and coaxially arranged with said chambers for receiving water, a series of spaced upstanding inwardly inclined ejector nozzles leading from said element connected to the wall of and opening into said expansion chamber for directing water against the wall of the combustion chamber for vaporizing the water, said nozzles providing a supporting means for said element, means connected to said threaded opening for simultaneously supplying fuel to said combustion chamber, a controllable water supply means opening into said element, igniting means within the combustion chamber for combusting the fuel supplied to such chamber, and a combined outlet and energy medium directing means leading from said expansion chamber and aligned with the imperforate part of the bottom of the wall of the combustion chamber.

THOMAS J. REES.